(12) United States Patent
Peterson

(10) Patent No.: US 8,943,801 B2
(45) Date of Patent: Feb. 3, 2015

(54) MULTI-PORT VALVE

(75) Inventor: Todd R. Peterson, New Boston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 932 days.

(21) Appl. No.: 12/933,890

(22) PCT Filed: Mar. 12, 2009

(86) PCT No.: PCT/US2009/036874
§ 371 (c)(1),
(2), (4) Date: Dec. 17, 2010

(87) PCT Pub. No.: WO2009/151681
PCT Pub. Date: Dec. 17, 2009

(65) Prior Publication Data
US 2011/0094484 A1 Apr. 28, 2011

Related U.S. Application Data

(60) Provisional application No. 61/040,803, filed on Mar. 31, 2008.

(51) Int. Cl.
*F02M 25/06* (2006.01)
*F02M 25/07* (2006.01)
(Continued)

(52) U.S. Cl.
CPC ....... *F02M 25/0729* (2013.01); *F02M 25/0724* (2013.01); *F02M 25/0773* (2013.01);
(Continued)

(58) Field of Classification Search
USPC .............. 123/568.12, 568.18, 568.24, 568.2, 123/568.11, 542; 701/108; 137/625.29, 137/625.46, 599.11, 596.12, 625.43; 60/278, 310
See application file for complete search history.

(56) References Cited

U.S. PATENT DOCUMENTS 4,543,996 A * 10/1985 Baron ...................... 137/625.43
4,653,537 A * 3/1987 Voith ....................... 137/625.43
(Continued)

FOREIGN PATENT DOCUMENTS

DE 19514572 A1 10/1996
EP 1002947 A1 5/2000
(Continued)

OTHER PUBLICATIONS

European Search Report on EP Application No. EP 09 76 2977 dated Dec. 21, 2011, Applicant: BorgWarner Inc., 7 pages.
(Continued)

*Primary Examiner* — Stephen K Cronin
*Assistant Examiner* — Joseph Dallo
(74) *Attorney, Agent, or Firm* — BrooksGroup

(57) ABSTRACT

A valve (10) may be used with an internal combustion engine exhaust breathing system (12) and may include a body (60), a partition (62), and a plate (66). The body (60) may define a first port (70) that has a first interior surface (76), and may also define a second port (82) that has a second interior surface (84). The partition (62) may be located within the body (60), may at least partially separate the first port (70) and the second port (82) from each other, and may define an opening (104). The plate (66) may be dimensioned to seat and seal against the opening (104) and against the first and second interior surfaces (76, 84). The plate (66) may rotate, depending on predetermined factors, between a first position and a second position.

21 Claims, 2 Drawing Sheets

(51) Int. Cl.
*F16K 1/22* (2006.01)
*F16K 11/052* (2006.01)

(52) U.S. Cl.
CPC ....... *F02M25/0793* (2013.01); *F02M 25/0796* (2013.01); *F16K 1/22* (2013.01); *F16K 11/0525* (2013.01); *Y02T 10/121* (2013.01)
USPC .......... 60/278; 123/568.12; 123/568.15; 123/568.17; 123/568.18; 123/568.23; 123/568.25; 123/568.27; 123/568.29; 137/625.43

(56) References Cited

U.S. PATENT DOCUMENTS

| | | | | |
|---|---|---|---|---|
| 5,911,243 | A * | 6/1999 | Cohen | 137/625.46 |
| 6,039,034 | A * | 3/2000 | Field et al. | 123/568.23 |
| 6,155,296 | A | 12/2000 | Roman | |
| 6,367,256 | B1 | 4/2002 | McKee | |
| 6,694,736 | B2 | 2/2004 | Pfluger | |
| 6,698,452 | B2 * | 3/2004 | Sisk et al. | 137/625.43 |
| 7,069,919 | B1 * | 7/2006 | Atkinson et al. | 123/568.19 |
| 7,428,897 | B2 * | 9/2008 | Koster et al. | 123/568.17 |
| 7,438,062 | B2 * | 10/2008 | Okawa et al. | 123/568.12 |
| 7,617,678 | B2 * | 11/2009 | Joergl et al. | 60/605.2 |
| 7,845,338 | B2 * | 12/2010 | Smith et al. | 123/568.12 |
| 7,958,874 | B2 * | 6/2011 | Kobayashi et al. | 123/568.17 |
| 8,011,422 | B2 * | 9/2011 | Yamazaki et al. | 165/82 |
| 8,230,681 | B2 * | 7/2012 | Kobayashi et al. | 60/324 |
| 2005/0199381 | A1 * | 9/2005 | Mercz et al. | 165/172 |
| 2005/0268600 | A1 * | 12/2005 | I et al. | 60/288 |
| 2007/0017489 | A1 * | 1/2007 | Kuroki et al. | 123/568.12 |
| 2007/0125081 | A1 * | 6/2007 | Czarnowski et al. | 60/599 |
| 2008/0184974 | A1 * | 8/2008 | Kobayashi et al. | 123/568.12 |
| 2009/0032129 | A1 * | 2/2009 | Yamawaki et al. | 137/625.46 |
| 2010/0108041 | A1 * | 5/2010 | Gruner et al. | 123/568.12 |

FOREIGN PATENT DOCUMENTS

| | | |
|---|---|---|
| EP | 1336736 | 8/2003 |
| FR | 2550605 | 2/1985 |
| JP | 2008530423 A | 8/2008 |
| JP | 2009228901 A2 | 10/2009 |
| WO | 9919649 | 4/1999 |
| WO | 2006/084867 | 8/2006 |
| WO | 2007079983 | 7/2007 |

OTHER PUBLICATIONS

Japanese Office Action dated Dec. 25, 2012; Applicant: BorgWarner Inc.; Application No. 2011-501891; 5 pages.

Chinese Office Action dated Jul. 9, 2014; Application No. 200980109815.0; Applicant: BorgWarner Inc.; 32 pages.

* cited by examiner

MULTI-PORT VALVE

This application claims the benefit of U.S. Provisional Application No. 61/040,803 filed Mar. 31, 2008.

TECHNICAL FIELD

The field to which the disclosure generally relates includes products including valves that regulate fluid-flow in an internal combustion engine exhaust breathing system.

BACKGROUND

Internal combustion engines are often equipped with exhaust breathing systems to, among other things, decrease emissions and increase engine efficiency. Such systems may include an exhaust gas recirculation (EGR) assembly having one or more coolers, a turbocharger, and other components. Valves and passages are commonly located throughout the system to regulate fluid-flow between the exhaust breathing system components.

SUMMARY OF EXEMPLARY EMBODIMENTS OF THE INVENTION

One embodiment of the invention includes a product comprising a valve that may be used with an internal combustion engine exhaust breathing system. The valve may include a body, a partition, and a plate. The body may define a first port that has a first interior surface, and may also define a second port that has a second interior surface. The partition may be located within the body and may at least partially separate the first port from the second port. The partition may also define an opening. The plate may be sized and dimensioned to seat within the opening, and to seat against the first and second interior surfaces. The plate may be selectively rotated between a first position, where engine exhaust gases and other fluid flows to an exhaust gas recirculation (EGR) cooler, and where fluid concurrently flows from the EGR cooler and to an exhaust breathing system component. The plate also rotates to a second position, where fluid flows to the exhaust system breathing component.

One embodiment of the invention includes a product comprising a valve comprising a body, a partition, and a plate. The body may define a first port that has a first interior surface and that extends from a first inlet and to a first outlet. The body may also define a second port that has a second interior surface and that extends from a second inlet and to a second outlet. The partition may be located between the first port and the second port so that the partition separates the first port from the second port. The partition may also define an opening. The plate may be sized and dimensioned to seat within the opening. The plate may also be sized and dimensioned to seat against the first and the second interior surfaces. The plate may be selectively rotated to a first position where engine exhaust gases and other fluid flows from the first inlet, through the first port, and to the first outlet, and simultaneously where fluid flows from the second inlet, through the second port, and to the second outlet. The plate may also be selectively rotated to a second position where fluid flows from the first inlet, through a portion of the first port, through a portion of the opening, through a portion of the second port, and to the second outlet.

One embodiment of the invention includes a product and a process comprising an internal combustion engine exhaust breathing system which may include an exhaust passage, a valve, and an exhaust gas recirculation (EGR) assembly that itself may include an EGR cooler. The valve may include a body, a partition, and a plate. The body may define a first port that has a first interior surface, and may define a second port that has a second interior surface. The partition may at least partially separate the first port from the second port, and the partition may define an opening. The plate may be sized and dimensioned to seal the opening, and to seat partly against both the first and second interior surfaces. The plate may be rotated to a first position where engine exhaust gases and other fluid flows between the exhaust passage and the EGR cooler, and concurrently where fluid flows between the EGR cooler and other components of the EGR assembly. And the plate may be rotated to a second position where fluid flows between the exhaust passage and components of the EGR assembly.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Referring now to FIGS. 1-4, embodiments of the invention include a product that may be a valve 10 that may be installed in an internal combustion engine exhaust breathing system 12 and may be equipped in an exhaust gas recirculation (EGR) assembly. In the example locations shown in FIG. 1, the valve 10 may direct fluid-flow through or around an EGR cooler. In other words, the valve 10 allows fluid to bypass the EGR cooler such as when an associated internal combustion engine 16 has a low temperature (e.g., at start-up) or when it is desired to increase the temperature of the air-fuel mixture supplied to the internal combustion engine, increase the temperature of the gases exhaled from the internal combustion engine, or increase the temperature of both. The valve 10 may be designed to have a compact size without compromising fluid-flow efficiency. In one embodiment, the valve 10 does not require greater than 45° of rotation in order to operate, which allows a more flexible choice in an associated actuator 18 in terms of its exact type, required torque, and the like. The valve's design also allows a more flexible choice in an associated EGR cooler in terms of its exact type, and the like.

Figure 1:
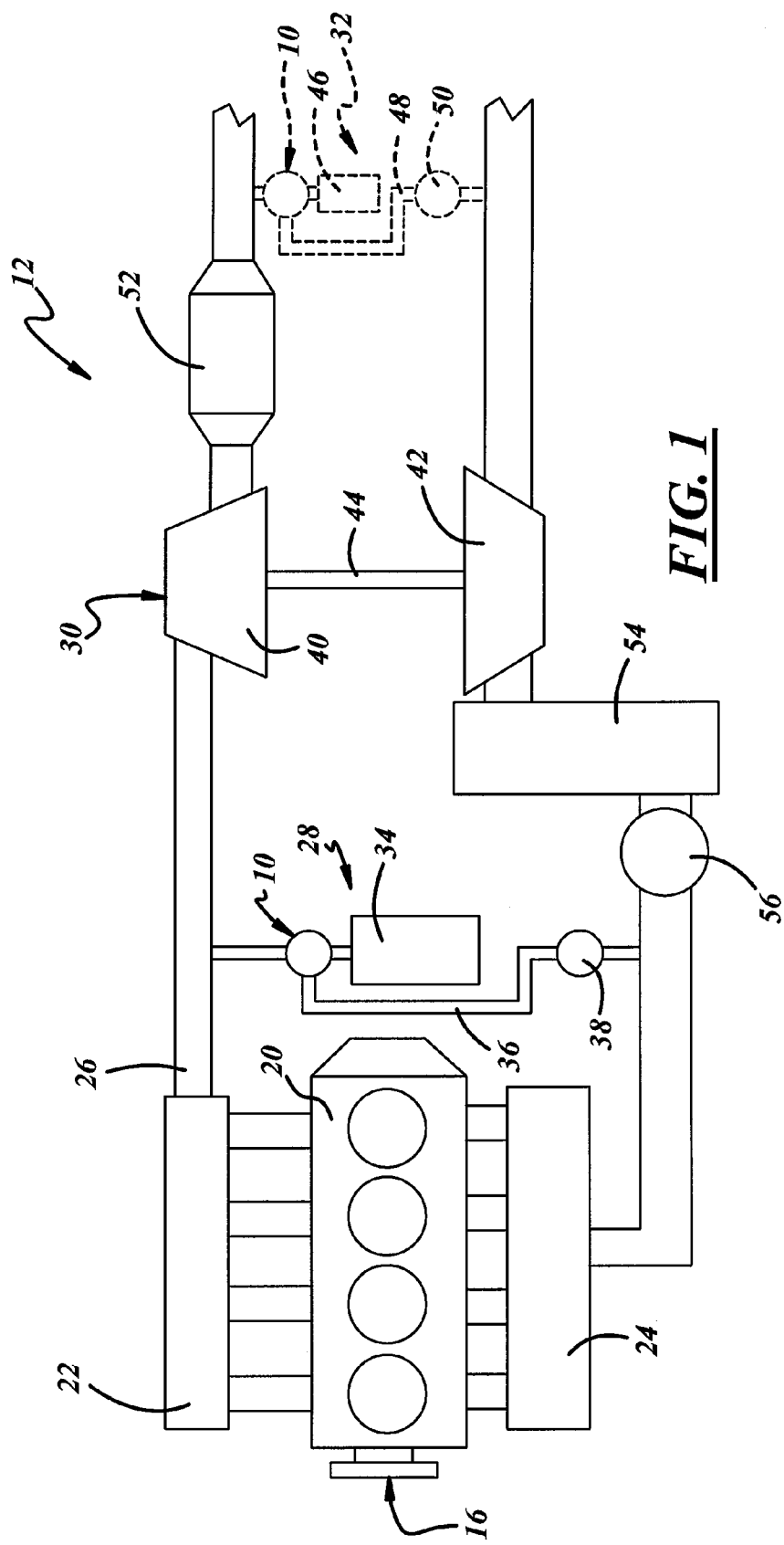
FIG. 1 illustrates a schematic of an embodiment of an internal combustion engine exhaust breathing system.

Referring to FIG. 1, an internal combustion engine 16 combusts fuel and expels fluid in the form of exhaust gases to the internal combustion engine exhaust breathing system 12.

The internal combustion engine 16 may be a spark-ignited engine or a diesel engine. The example shown is a diesel engine that may be of different types having different arrangements and different numbers of cylinders (e.g., in-line, V-type, V-6, V-8, etc.). Although not shown, typical diesel engines may include, among other components, a crankcase to house and support a crankshaft assembly, and an oil pan mounted underneath the crankcase to collect engine oil. A cylinder block 20 may be mounted on top of the crankcase and may define a plurality of piston bores or cylinders. An exhaust manifold 22 may be equipped on an exhaust side of the internal combustion engine 16 to direct fluid-flow, such as the exhaust gases, exhaled from the engine and to the internal combustion engine exhaust breathing system 12. An intake manifold 24 may be equipped on an opposite side, or an intake side, of the internal combustion engine 16 in order to direct and supply air or air-fuel mixture to the engine.

The internal combustion engine exhaust breathing system 12 may be used with the internal combustion engine 16 in order to manage fluid-flow discharged out of the engine and in order to, in some cases, decrease exhaust gases and increase engine efficiency. The internal combustion engine exhaust breathing system 12 may come in various arrangements and may have various exhaust breathing system components. The example shown in FIG. 1 may include an exhaust passage 26, a high pressure exhaust gas recirculation (EGR) assembly 28, a turbocharger 30, and a low pressure EGR assembly 32.

The EGR assembly 28 may recirculate and direct a measured amount of engine exhaust gas back into the intake manifold 24. Depending on the circumstances, this can decrease or increase the combustion temperature in the internal combustion engine 16. To do so, the EGR assembly 28 communicates the exhaust manifold 22 with the intake manifold 24. The EGR assembly 28 may come in various arrangements and may have various components. The example shown may include an EGR cooler 34, an EGR passage 36 that permits fluid-flow between the exhaust and intake manifolds 22 and 24, and an EGR valve 38. The EGR cooler 34 is a heat exchanger that lowers the temperature of engine exhaust gases and other fluids that flow therethrough. The EGR cooler 34 may communicate with and may be located downstream of the valve 10. In one embodiment, the EGR cooler 34 may be of the type having a U-shaped tube, and in another embodiment, the EGR cooler 34 may be of the in-line type. The EGR valve 38 regulates and times the engine exhaust gas fluid-flow from the exhaust passage 26 and back to the intake manifold 24. The EGR valve 38 may be located downstream the valve 10 and downstream the EGR cooler 34 as shown, or, in other embodiments, may be located upstream the valve 10.

In one embodiment, the turbocharger 30 may be provided and may be driven by engine exhaust gas fluid-flow in order to force an additional amount of air or air-fuel mixture into the internal combustion engine 16 to help improve engine performance. The turbocharger 30 may be located downstream the exhaust manifold 22. The turbocharger 30 may come in various types including a fixed geometry turbocharger, a variable geometry turbocharger, a 1-stage turbocharger, a 2-stage turbocharger, or the like. One example of the turbocharger 30 may include a turbine 40 that is directly driven by the engine exhaust gas fluid-flow, and that in turn drives a compressor 42 through a common shaft 44. The compressor 42 compresses air that eventually enters the intake manifold 24.

Still referring to FIG. 1, and similar in some ways to the high pressure EGR assembly 28, in one embodiment the low pressure EGR assembly 32 (shown in phantom) may be provided and may recirculate and direct a measured amount of engine exhaust gas back to the intake side and eventually to the intake manifold 24. Depending on the arrangement, the internal combustion engine exhaust breathing system 12 may include only the high pressure EGR assembly 28, only the low pressure EGR assembly 32, or may include both. The EGR assembly 32 may be located downstream the turbocharger 30 and may extend between and communicate the intake side with the exhaust side of the internal combustion engine 16. Similar to the EGR assembly 28 as already described, the EGR assembly 32 may include an EGR cooler 46, an EGR passage 48, and an EGR valve 50.

The internal combustion engine exhaust breathing system 12 may also include a diesel particulate filter (DPF) 52 that removes diesel particulate matter from the engine exhaust gases flowing out of the internal combustion engine 16. The DPF 52 may be located downstream the turbocharger 30 and upstream the EGR assembly 32. A charge-air cooler 54 may be located downstream the compressor 42 on the intake side of the internal combustion engine 16. The charge-air cooler 54 may lower the temperature of the air exiting the compressor 42 and thus increasing its density. An intake throttle valve 56 may be located downstream the charge-air cooler 54 on the intake side of the internal combustion engine 16. The throttle valve 56 may regulate the flow of air or air-fuel mixture entering the internal combustion engine 16.

Figure 2:
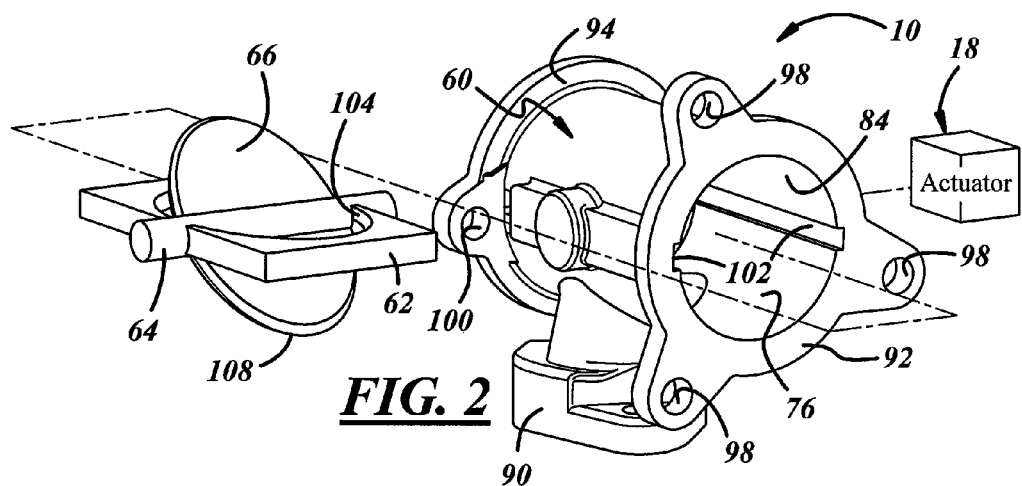
FIG. 2 illustrates a perspective and partially exploded view of an embodiment of a valve that may be used in the exhaust breathing system of FIG. 1.
Figure 3:
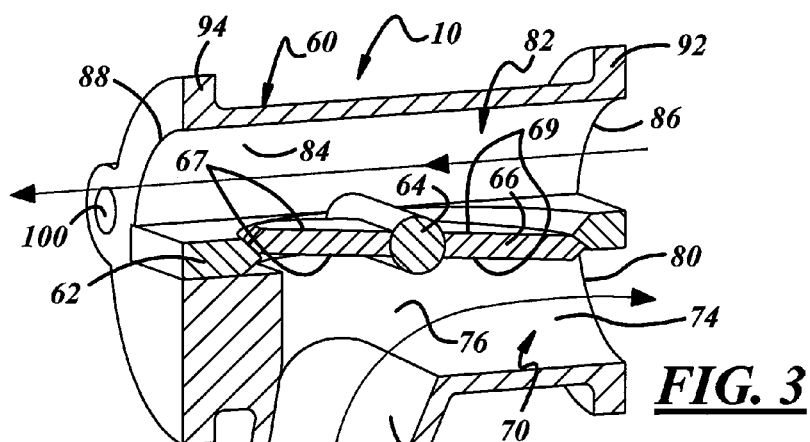
FIG. 3 illustrates a cross-sectional view of the valve of FIG. 2 showing a plate in a first position.
Figure 4:
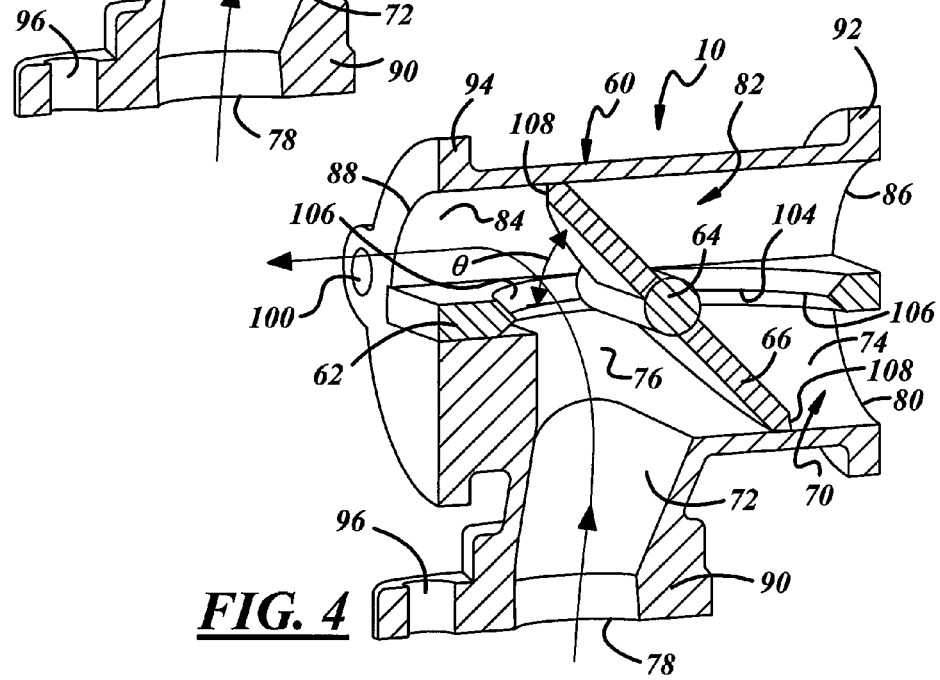
FIG. 4 illustrates a cross-sectional view of the valve of FIG. 2 showing a plate in a second position.

FIGS. 2-4 show different views of one embodiment of the valve 10 that may be used with the internal combustion engine exhaust breathing system 12; the valve 10 may be a component of the EGR assembly 28, the EGR assembly 32, or both, or may be utilized elsewhere in the internal combustion engine exhaust breathing system. Taking the EGR assembly 28 as an example, the valve 10 may control and regulate engine exhaust gas fluid-flow in the EGR assembly 28 and to the EGR cooler 34. That is, the valve 10 may selectively permit (open) fluid-flow to and from the EGR cooler 34 or prevent (close) fluid-flow to and from the EGR cooler 34. When prevented, engine exhaust gas fluid-flow is diverted around, or otherwise bypasses, the EGR cooler 34 through the EGR passage 36. In this sense, the valve 10 may constitute a cooler bypass valve of the EGR assembly. In some internal combustion engine exhaust breathing systems 12, it may be desirable to bypass the particular EGR cooler when, for example, the use of recirculated cooled engine exhaust emissions delays or prevents the internal combustion engine 16 from reaching its optimal combustion temperature, or when the internal combustion engine temperature is low such as at start-up. Referring to FIG. 1, in the embodiment shown, the valve 10 may be located downstream the exhaust manifold 22 and may communicate with and may be located downstream the exhaust passage 26. The valve 10 may also be located upstream the EGR cooler 34, and may communicate with and may be directly piped to the EGR cooler 34, or may be directly connected to the cooler 34. In other embodiments, the valve 10 may be mounted directly to the internal combustion engine 16, as opposed to being downstream the exhaust passage 26.

Again referring to FIGS. 2-4, the valve 10 may include a body 60, a partition 62 located within the body, a rotatable rod 64, a plate 66 that can rotate with the rod, and the actuator 18 that operates the valve. The body 60 houses and supports other components of the valve 10, may form fluid-flow passages throughout the valve, and may connect the valve to exhaust breathing system components or to the internal combustion engine 16, as the case may be. The body 60 may be a one-piece structure, or may be made of separate pieces that are subsequently put-together. The body 60 may be composed of a material that is impervious to engine exhaust gases, for example, suitable materials may include a ductile iron, a high silicon iron, a steel alloy such as a stainless steel, a ceramic, a high temperature plastic, or the like. The exact dimensions of the body 60 may vary among different internal combustion engine exhaust breathing systems, and may depend on, but is not limited to, the size and type of the associated internal combustion engine, and the desired fluid-flow through the valve. The body 60 may define a first port 70 that can pass fluid-flow therethrough. In the embodiment shown in FIGS. 3 and 4, the first port 70 has about a 90° bend in it and has a first portion 72 having a generally circular cross-section, and has a second portion 74 which may have a generally half-circle cross-section. The first port 70 may be bounded in part by a first interior surface 76, and the first port extends at one end from a first inlet 78 and at another end to a first outlet 80.

The body 60 may also define a second port 82 that can pass fluid-flow therethrough; in this sense, the valve 10 may constitute a multi-port valve. The second port 82 may be located adjacent the first port 70 within the body 60. The second port 82 may extend in a generally linear direction, or otherwise does not turn, and may have a generally half-circle cross-section. The second port 82 may be bounded in part by a second interior surface 84, and may extend at one end from a second inlet 86 and at another end to a second outlet 88. The body 60 may form several flanges that may be designed to, among other things, strengthen the body at the particular flange, connect the body to a particular exhaust breathing system component, and the like. For example, a first flange 90 may be formed around the first inlet 78 and may have a one or more holes 96 (only one shown) for fastening the body 60 to an exhaust breathing system component. A second flange 92 may be formed around both the first outlet 80 and the second inlet 86, and may have one or more holes 98 to fasten the body 60 to an exhaust breathing system component. And a third flange 94 may be formed around the second outlet 88, and may have one or more holes 100 to fasten the body 60 to an exhaust breathing system component.

Referring to FIGS. 2-4, the partition 62 may be a wall that divides the otherwise undivided interior structure of the body 60, and may be a shared wall that separates the first port 70 and the second port 82. The partition 62 may be a separate piece from the body 60 that is press-fit in a slot 102 defined within the body as shown, or may be otherwise held in the body; in other embodiments, the partition 62 may be formed unitary with the body 60. The partition 62 may extend in the direction of fluid-flow (axially) at one end from the second outlet 88, and at another end to the first outlet 80 and the second inlet 86; and may extend radially from one side of the interior surface and to the other side of the interior surface. The partition 62 may separate the first port 70 and the second port 82 so that the second portion 74 generally has the same shape and size as the second port 82. An opening 104 may be defined completely through the partition 62. The opening 104 may be bounded completely by the partition 62 and may have an oval shape as shown, or other shape. A peripheral rim 106 may be formed around a perimeter of the opening 104, and may have an angled or otherwise pointed surface projecting radially inward with respect to a center of the opening 104.

The rod 64, when operated, may rotate about its own center axis and with respect to the opening 104. The rod 64 may have a cylindrical shape as shown, and may be carried by the body 60, by the partition 62, or partly carried by both the body 60 and the partition 62. The rod 64 may extend from one side of the body 60 and to the other side, and may extend across the opening 104. In one embodiment, the rod 64 may include a pair of concentric rods—one solid and one hollow; in use, one of the rods may rotate while the other rod remains stationary.

The plate 66 may be attached to the rod 64 and may rotate with the rod in order to deflect fluid-flow in the valve 10 as desired. In some embodiments, the plate 66 and the rod 64 may be one-piece, and in other embodiments, the plate 66 may be a separate piece that is attached to the rod 64. The plate 66 can be sized and shaped to match that of the opening 104; in this case, the plate has a complementary oval shape. The plate 66 may have a generally flat body with a uniform thickness. It may form a peripheral rim 108 projecting radially outward from its body and may erect a pair of angled surfaces that come to a point. The peripheral rim 108 may be complementary to the peripheral rim 106 of the opening 104 in the sense that, when abutted, the angled surfaces of each rim mate against each other, seal with each other, and are stopped by each other. In one embodiment, the plate 66 may have a balanced area distribution; in other words, the plate 66 may define a first area 67 on one side of the rod 64, and may define a second area 69 on an opposite side of the rod, the second area being approximately equal in value to the first area, thereby reducing the torque required to rotate the rod.

Referring to FIG. 2, the actuator 18 selectively operates (in this case rotates) the rod 64 and the plate 66 in order to deflect fluid-flow in the valve 10 as desired. The actuator 18 may be of various types including electromechanical such as an electric motor or solenoid, pneumatic which is controlled by air pressure, or hydraulic which is controlled by the pressure of liquid such as oil or water. In one embodiment, the actuator 18 may be located outside of the body 60 as shown, being operatively connected to the rod 64 through mechanical linkage, or may be located inside or otherwise integrated to the body 60. The actuator 18 may be a single actuator that is controlled by an associated vehicle electronic control unit (ECU) (not shown) through a closed-loop or open-loop control system using feedback control. In one embodiment, the actuator 18 may be used for dual functions; for example, the actuator 18 may be used to concurrently operate the valve 10 and the EGR valve 38. Whether the actuator 18 has dual functionality may depend on, among other things, the sequences required by the different valves.

In use, the actuator 18 operates the valve 10, and rotates the plate 66 between a first position, or cooler mode, and a second position, or bypass mode. The actuator 18 may also rotate the plate 66 to any degree between the first position and the second position. In the first position as shown FIG. 3, the plate 66 is seated against and sealed completely around the opening 104 of the partition 62. Here, engine exhaust gases and other fluid flows from a first exhaust breathing system component, such as the exhaust passage 26, through the first inlet 78, and into the first port 70. Fluid-flow is deflected by the plate 66 from the first portion 72 and to the second portion 74 in the first port 70. The fluid then flows out of the first outlet 80 and into, in this example, the EGR cooler 34. Fluid simultaneously flows from the EGR cooler 34, through the second inlet 86, and into the second port 82. The fluid continues to flow out of the second outlet 88 and to a second exhaust breathing system component, such as the EGR passage 36 or the EGR valve 38.

In the second position as shown in FIG. 4, the actuator 18 rotates the plate 66 in a clockwise direction so that the plate is seated partly against, and seals partly with, both the first interior surface 76 and the second interior surface 84. The plate 66 is seated such that engine exhaust gases and other fluid does not flow to or from the EGR cooler 34, and thus no existing contamination in the exhaust gases gets to the EGR cooler in the second position. Instead, fluid flows from the first exhaust breathing system component, through the first inlet 78, and into the first portion 72 of the first port 70. From there, the plate 66 deflects the fluid through a portion of the opening 104 in the partition 62, through a portion of the second port 82, and out the second outlet 88. The flow then continues to the second exhaust breathing system component.

From the first position and to the second position, and vice-versa, the actuator 18 rotates or revolves the plate 66 for a total angle of rotation Θ of about 45° in one embodiment, and less than 45° in another embodiment. Such a relatively small angle of rotation Θ permits a flexible choice of the type of actuator that is used with the valve 10.

In other embodiments, the valve 10 may be equipped to components that are not necessarily a part of the internal combustion engine exhaust breathing system 12; that is, the valve may have other applications. Also, in the internal combustion engine exhaust breathing system 12 and in other applications, the direction of the fluid-flow may be opposite to the direction shown and described.

The above description of embodiments of the invention is merely exemplary in nature and, thus, variations thereof are not to be regarded as a departure from the spirit and scope of the invention.

What is claimed is:

1. A product comprising:
   a valve (10) for use with an internal combustion engine exhaust breathing system (12), the valve (10) comprising:
   a body (60) defining a first port (70) having a first interior surface (76), and defining a second port (82) having a second interior surface (84);
   a partition (62) located within the body (60) and at least partially separating the first port (70) and the second port (82), the partition (62) defining an opening (104); and
   a plate (66) being dimensioned to seat within the opening (104) and to seat against the first and second interior surfaces (76, 84), the plate (66) selectively rotating between a first position where fluid flows to an exhaust gas recirculation (EGR) cooler (34, 46) and where fluid flows from the EGR cooler (34, 46) and to an exhaust breathing system component, and a second position where fluid flows to the exhaust breathing system component wherein the plate rotates approximately 45 degrees or less.

2. A product as set forth in claim 1 wherein the valve (10) further comprises a rod (64) being rotatably carried by the body (60), by the partition (62), or by both, and wherein the product further comprises an actuator (18) that is operatively connected to the rod (64) in order to selectively rotate the plate (66) between the first position and the second position.

3. A product as set forth in claim 2 wherein the first port (70) extends from a first inlet (78) and to a first outlet (80), and wherein the second port (82) extends from a second inlet (86) and to a second outlet (88) and wherein the rod is centrally disposed on the plate.

4. A product as set forth in claim 3 wherein, when the plate (66) is in the first position, fluid flows from the first inlet (78), through the first port (70), and to the first outlet (80) and to the EGR cooler (34, 46), and fluid flows from the second inlet (86) and from the EGR cooler (34, 46), through the second port (82), and to the second outlet (88).

5. A product as set forth in claim 4 wherein, when the plate (66) is in the second position, fluid flows from the first inlet (78), through a portion of the first port (70), through a portion of the opening (104), through a portion of the second port (82), and to the second outlet (88), bypassing the EGR cooler (34, 46) and preventing fluid flow to the first outlet (80) and to the second inlet (86).

6. A product as set forth in claim 1 wherein the valve (10) further comprises a rod (64) being rotatably carried by the body (60), by the partition (62), or by both, and wherein the plate (66) defines a first area (67) on one side of the rod (64), and defines a second area (69) on the opposite side of the rod (64), the first area and the second area having approximately the same value and wherein the rod and the plate comprise a single integral piece.

7. A product as set forth in claim 1 wherein, when the plate (66) is in the first position, the plate (66) is seated against a peripheral rim (106) of the opening (104), and wherein, when the plate (66) is in the second position, the plate (66) is seated partly against the first interior surface (76) and partly against the second interior surface (84).

8. A product as set forth in claim 1 wherein the plate (66) revolves for a total angle of rotation from the first position and to the second position of less than 45 degrees.

9. A product comprising:
   a valve (10) comprising:
   a body (60) defining a first port (70) having a first interior surface (76) and extending from a first inlet (78) and to a first outlet (80), the body (60) defining a second port (82) having a second interior surface (84) and extending from a second inlet (86) and to a second outlet (88),
   a partition (62) located between the first port (70) and the second port (82) in order to separate the first port (70) and the second port (82), the partition (62) defining an opening (104); and
   a plate (66) being dimensioned to seat within the opening (104), and being dimensioned to seat against the first and second interior surfaces (76, 84), the plate (66) selectively rotating between a first position where fluid flows from the first inlet (78), through the first port (70), and out the first outlet (80), and where fluid flows from the second inlet (86), through the second port (82), and out the second outlet (88), and a second position where fluid flows from the first inlet (78), through a portion of the first port (70), through a portion of the opening (104), through a portion of the second port (82), and out the second outlet (88) wherein the plate rotates less than 45 degrees.

10. A product as set forth in claim 9 wherein the valve (10) further comprises a rod (64) extending across the opening (104) and being rotatably carried by the body (60), by the partition (62), or by both, and wherein the product further comprises an actuator (18) that is operatively connected to the rod (64) in order to selectively rotate the plate (66) between the first position and the second position and wherein the rod is a concentric rod.

11. A product as set forth in claim 9 wherein the valve (10) further comprises a rod (64) extending across the opening (104) and being rotatably carried by the body (60), by the partition (62), or by both, and wherein the plate (66) defines a first area (67) on one side of the rod (64), and defines a second area (69) on the opposite side of the rod (64), the first area and the second area having approximately the same value.

12. A product as set forth in claim 9 wherein, when the plate (66) is in the first position, the plate (66) is seated against a peripheral rim (106) of the opening (104), and wherein, when the plate (66) is in the second position, the plate (66) is seated partly against the first interior surface (76) and partly against the second interior surface (84).

13. A product as set forth in claim 9 wherein the plate (66) revolves for a total angle of rotation from the first position and to the second position of less than 45 degrees.

14. A product comprising:
an internal combustion engine exhaust breathing system (12) comprising an exhaust passage (26), a valve (10) located downstream the exhaust passage (26), and an exhaust gas recirculation (EGR) assembly (28, 32) including an EGR cooler (34, 46), the valve (10) comprising:
- a body (60) defining a first port (70) having a first interior surface (76), and defining a second port (82) having a second interior surface (84);
- a partition (62) at least partially separating the first port (70) and the second port (82), the partition (62) defining an opening (104); and a plate (66) being dimensioned to seal the opening (104) and to seat against the first and second interior surfaces (76, 84), the plate (66) electively rotating between a first position where fluid flows between the exhaust passage (26) and the EGR cooler (34, 46) and where fluid flows between the EGR cooler (34, 46) and other components of the EGR assembly (28, 32), and a second position where fluid flows between the exhaust passage (26) and components of the EGR assembly (28, 32) wherein the plate revolves for a total angle of rotation from the first position to the second position of less than 45 degrees.

15. A product as set forth in claim 14 wherein the valve (10) further comprises a rod (64) being rotatably carried by the body (60), by the partition (62), or by both, and wherein the product further comprises an actuator (18) operatively connected to the rod (64) in order to selectively rotate the plate (66) between the first position and the second position.

16. A product as set forth in claim 14 wherein the first port (70) extends from a first inlet (78) and to a first outlet (80), and wherein the second port (82) extends from a second inlet (86) and to a second outlet (88).

17. A product as set forth in claim 16 wherein, when the plate (66) is in the first position, fluid flows from the first inlet (78), through the first port (70), and to the first outlet (80), and fluid flows from the second inlet (86), through the second port (82), and to the second outlet (88), and wherein, when the plate (66) is in the second position, fluid flows from the first inlet (78), through a portion of the first port (70), through a portion of the opening (104), through a portion of the second port (82), and to the second outlet (88).

18. A product as set forth in claim 16 wherein the body (60) forms a first flange (90) that is disposed around the first inlet (78), forms a second flange (92) that is disposed around the first outlet (80) and the second inlet (86), and forms a third flange (94) that is disposed around the second outlet (88).

19. A product as set forth in claim 14 wherein, when the plate (66) is in the first position, the plate (66) is seated against a periphery of the opening (104), and wherein, when the plate (66) is in the second position, the plate (66) is seated partly against the first interior surface (76) and partly against the second interior surface (84).

20. A product as set forth in claim 14 wherein the plate (66) is a single piece, oval shaped plate.

21. A process comprising:
providing an internal combustion engine exhaust breathing system (12) comprising an exhaust passage (26), a valve (10) located downstream the exhaust passage (26), and an exhaust gas recirculation (EGR) assembly (28, 32) including an EGR cooler (34, 46);
providing the valve (10) comprising :
- a body (60) defining a first port (70) and a second port (82);
- a partition (62) separating the first port (70) and the second port (82), the partition (62) defining an opening (104);
- a rod (64) being rotatably carried by the body (60), by the partition (62), or by both; and
- a plate (66) rotatable with the rod (64) and being dimensioned to seal the opening (104) and to seal the first port (70) and the second port (82);
rotating the plate (66) to a first position where fluid flows from the exhaust passage (26) and to the EGR cooler (34, 46), and where fluid flows from the EGR cooler (34, 46) and to other components of the EGR assembly (28, 32); and
rotating the plate (66) to a second position where fluid flows from the exhaust passage (26) and to components of the EGR assembly (28, 32) wherein the plate rotates approximately 45 degrees or less.

* * * * *